May 6, 1924. 1,492,892
J. B. MUSE
COMBINATION DRIER AND COOKER
Filed April 4, 1923
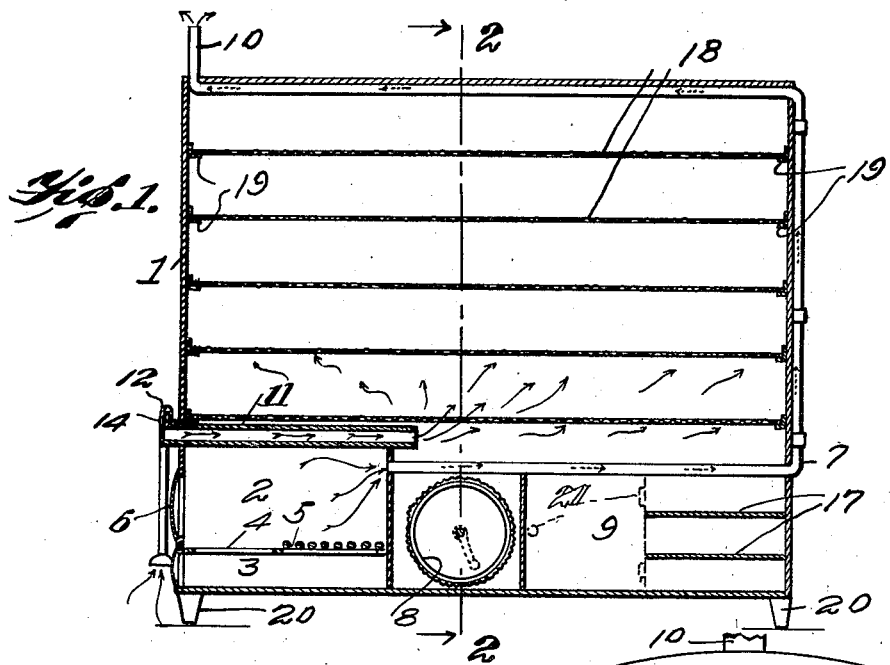
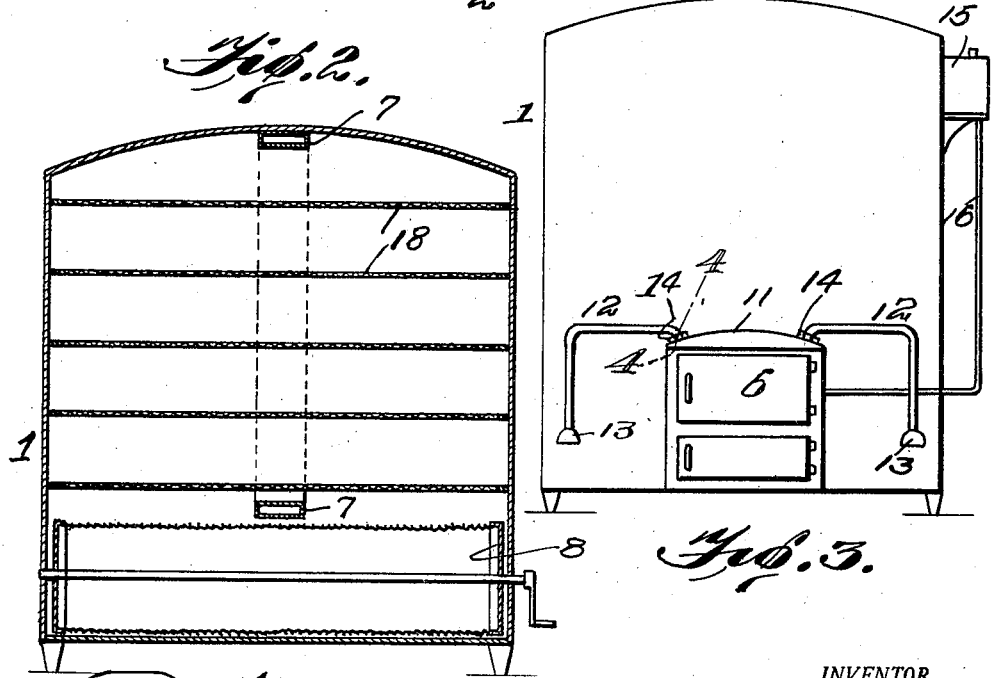
INVENTOR.
J. B. Muse
BY
his ATTORNEYS.

Patented May 6, 1924.

1,492,892

UNITED STATES PATENT OFFICE.

JOHN BIRT MUSE, OF CAMERON, NORTH CAROLINA, ASSIGNOR OF ONE-HALF TO ANGUS B. CAMERON, OF CARTHAGE, NORTH CAROLINA.

COMBINATION DRIER AND COOKER.

Application filed April 4, 1923. Serial No. 629,868.

*To all whom it may concern:*

Be it known that I, JOHN B. MUSE, a citizen of the United States, residing at Cameron, in the county of Moore and State of North Carolina, have invented certain new and useful Improvements in Combination Driers and Cookers, of which the following is a specification, reference being had therein to the accompanying drawings.

This invention relates to a combination drier and cooker, and the object of the invention is the construction of a simple and efficient apparatus for drying fruit or vegetables, cooking or roasting peanuts, and if desired, baking pastry and bread and the like.

With the foregoing and other objects in view, my invention comprises certain novel combinations, constructions and arrangements of parts as will be hereinafter described, illustrated in the accompanying drawings, and more particularly pointed out in the appended claims.

In the drawings:

Figure 1 is a longitudinal, sectional view of an apparatus constructed in accordance with the present invention, while Figure 2 is a sectional view, taken on line 2—2, Fig. 1, and looking in the direction of the arrows.

Figure 3 is a view in front elevation of the apparatus.

Figure 4 is an enlarged, sectional view, taken on line 4—4, Fig. 3.

Referring to the drawings by numerals, 1 comprises the primary casing in the bottom of which is a fire-box 2 provided with grate 3. The grate 3 is provided with comparatively wide slots 4, upon which wood may be placed, whereas portion 5 may be used for burning coal. If it is desired, the grate can be reversed so as to place portion 5 near the door 6, when burning coal. The angular smoke pipe 7 opens at its inner end into the fire-box 2, and extends outwardly across the cylinder peanut container 8 and the baking chamber 9, thence the smoke pipe 7 extends through the rear wall of casing 1 upwardly to near the top of the casing and thence inside the casing to the front of the same, and then through the top as shown at 10. Heat and smoke passing through the pipe 7 will assist in heating the entire apparatus, as a great amount of the pipe is exposed to the interior of the casing 1, Fig. 1.

Above the fire-box 2 is positioned the fresh air casing 11; this air casing 11 is comparatively broad and flat and projects at its outer end beyond the outer front face of casing 1 (Figs. 1 and 3). A pair of inlet pipes 12 are detachably associated with the air casing 11 as follows: Each inlet pipe 12 is substantially U-shape, having at its outer, lower end a nozzle 13, allowing the air to readily enter the pipe; the inner end of pipe 12 is threaded into the top of air casing 11, and on the threaded end is a nut 14 which is normally screwed tight against casing 11 for holding the pipe 12 close to casing 1, for efficient operation. By unscrewing nuts 14, the pipes 12 can be unscrewed from casing 11, and upon screwing nuts 14 tight upon casing 11 the pipes 12 will be held out of the way, and as close to the casing 1 as the operator desires.

An oil tank 15 is placed upon the side of casing 1, and the pipe 16 provides means for supplying the furnace of an apparatus with oil, which furnace is constituted by the fire-box 2 and its coordinate parts.

The peanut roaster 8 can be utilized at the will of the operator for roasting peanuts or coffee beans, or the like.

In the baking compartment 9 suitable pans 17 are positioned, whereby my apparatus can be utilized, if desired, for baking pastry, or bread, or the like.

The drying trays 18 are placed above the fire-box 2, peanut roaster 8 and pans 17 by supporting the same upon angle brackets 19, fastened to the inner face of the casing 1.

Legs 20 support the apparatus off the floor, or any suitable support.

Dotted lines 21 designate the door for the baking compartment 9, Fig. 1.

It is to be understood that fresh air entering air inlet pipes 12 passes into the flat air casing 11, thence is discharged into the interior of the apparatus, preferably against drying trays 18, as shown by the arrows in Fig. 1.

While I have described the preferred embodiment of my invention, and have illustrated the same in the accompanying drawings, certain minor changes or alterations may appear to one skilled in the art to which this invention relates, during the extensive manufacture of the same and I, therefore, reserve the right to make such alterations or changes as shall fairly fall within the scope of the appended claims.

What I claim is:

1. In an apparatus of the class described, the combination of a casing provided with a fire-box, said casing provided with a peanut roaster and with a baking compartment, baking pans in said baking compartment, and drying trays in said casing above said fire-box, peanut roaster and baking compartment.

2. In an apparatus of the class described, the combination of a casing provided with a fire-box, a smoke pipe opening at its inner end into said fire-box and extending outwardly and through one end of the casing and extending upward on the outside of said casing, said smoke pipe extending into said casing against the top thereof and through the top at the outer end of said smoke pipe, and a drying tray in said casing above said fire-box and between portions of the smoke pipe, substantially as shown and described.

3. In an apparatus of the class described, the combination of a casing provided in its bottom and at its front end with a fire-box, a flat air casing over said fire-box and extending at its inner end beyond the inner end of the fire-box and opening into said casing, said air casing extending at its outer end beyond the outer face of said casing, a pair of inverted substantially U-shaped air inlet pipes provided on their outer ends with nozzles, each pipe provided with a threaded inner end extending into said air casing, a lock nut on the inner end of each air inlet pipe against the air casing, and a smoke pipe connected to said fire-box and extending through the casing, substantially as shown and described.

4. In an apparatus of the class described, the combination of a casing provided with a fire-box, an air casing in said first-mentioned casing above the fire-box, a plurality of air inlet pipes connected to said air casing, means locking said air inlet pipes on said air casing, and a smoke pipe connected to said fire-box.

5. In an apparatus of the class described, the combination of a casing provided with a fire-box, a projecting air casing above said fire-box, rotatable air inlet pipes connected to the projecting portion of said air casing, rotatable locking means on said air inlet pipes, and a smoke pipe connected to said fire-box and extending through and above said casing.

In testimony whereof I hereunto affix my signature.

JOHN BIRT MUSE.